E. E. HOSMER.
ANTISKIDDING ATTACHMENT TO AUTO WHEELS.
APPLICATION FILED JULY 26, 1912.
1,069,137. Patented Aug. 5, 1913.
Fig. 1.
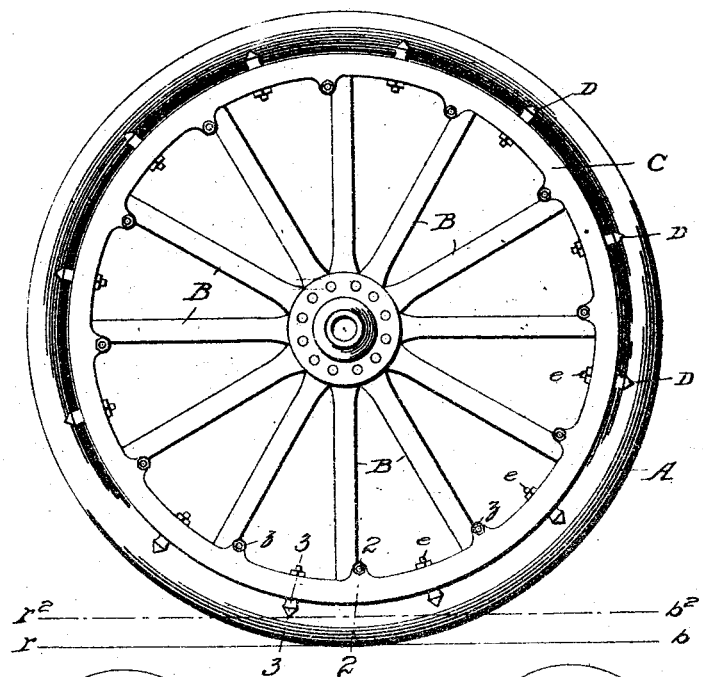
Fig. 2.
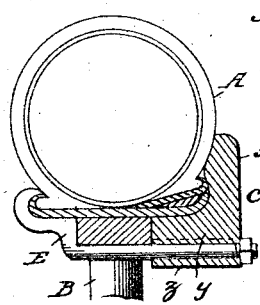
Fig. 3.
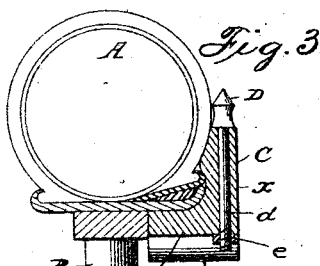
Fig. 6.
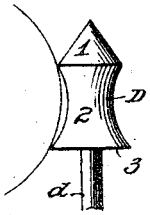
Fig. 4.
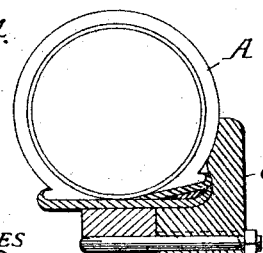
Fig. 5.
WITNESSES
C. C. Duffy
A. R. Stanton
INVENTOR
Edward E. Hosmer
By Edw. W. Byrn, Attorney

UNITED STATES PATENT OFFICE.

EDWARD E. HOSMER, OF EAST LYNN, MASSACHUSETTS.

ANTISKIDDING ATTACHMENT TO AUTO-WHEELS.

1,069,137. Specification of Letters Patent. Patented Aug. 5, 1913.

Application filed July 26, 1912. Serial No. 711,651.

*To all whom it may concern:*

Be it known that I, EDWARD E. HOSMER, a citizen of the United States, residing at East Lynn, in the county of Essex and State of Massachusetts, have invented certain new and useful Improvements in Antiskidding Attachments to Auto-Wheels, of which the following is a specification.

The object of my invention is to provide an attachment to automobile wheels having pneumatic tires, the purpose being to prevent the skidding of the wheel when it becomes collapsed or deflated and having also other values and advantages as hereafter described.

My invention comprises a simple ring-shaped attachment made in one continuous piece of angle iron cross section, having two flanges at right angles to each other and bearing in one of the flanges the shanks of a series of radially arranged outwardly projecting prods which normally are out of tangential contact with the road bed, but, when the tire is deflated, come into bearing contact against the road bed to prevent skidding, said ring-shaped attachment fitting flush against the side of the rim of the wheel and also against the side of the pneumatic tire and extending out to about the median line of the same and bearing against the same out to its extreme outer edge and being detachably secured in place by hook bolts as hereinafter more fully described with reference to the drawing, in which—

Figure 1 is a side view of an automobile wheel with my attachment applied. Fig. 2 is a section taken through line 2—2 of Fig. 1 with the hook bolt engaging the rim. Fig. 3 is a similar section taken through line 3—3 of Fig. 1, showing one of the prods. Fig. 4 is a section similar to Fig. 2, showing the hook bolt engaging the spokes. Fig. 5 is a cross section corresponding to Fig. 3, but showing a modification of the invention, and Fig. 6 is an enlarged detail of the prod.

In the drawing A represents the pneumatic tire and B the spokes of an automobile wheel.

C is my ring-shaped attachment, which is a continuous rigid metal ring of the cross section shown in Figs. 2 and 3 having the face next to the tire curved to correspond to the metal rim and having two flanges $x$ and $y$ of which $x$ is parallel to the plane of the wheel $y$ at right angles to the same and extending into the spokes. The diameter of the inner flange $y$ of the ring is substantially the same as that of the rim of the wheel and somewhat less than that of the pneumatic tire, but the outer flange $x$ extends out to about the middle of the tire and lies flat against it. It is rigidly secured to the rim in a detachable way by hook bolts E, Fig. 2, which pass at right angles to the plane of the wheel through holes in ears $z$ formed on the inner periphery of the ring. These hook bolts have their hooks turned to engage either the circular metal rim of the wheel, as shown in Fig. 2, or are turned at right angles with a shorter bend to hook around the outer ends of the spokes, as in Fig. 4, or a combination of both of these connections may be employed to make a more rigid connection of the attachment to the wheel in resisting the torque or tractile strain. In the flange $x$, which is parallel to the plane of the wheel, there is formed a series of radial holes in which are arranged the shanks $d$, Fig. 3, of the prods D which extend at close intervals around the entire circumference of the wheel, as in Fig. 1. These prods are formed with enlarged heads, each having a conical end 1, see Fig. 6, a concave neck 2 and a shoulder 3 with reduced shank $d$.

The conical end 1 forms an engaging bearing for the roadbed, the concave neck 2 corresponds to the curve of the pneumatic tire and fits closely against the same, and the shoulder 3 rests upon the outer periphery of the flange $x$ of the ring-shaped attachment while the long shank $d$ has a long and strong bearing in the outer flange $x$ of the ring parallel to said flange. It is firmly but detachably held to this position by a nut $e$ turned upon the inner screw threaded end of the shank $d$ of the prod to a tight bearing against the inner edge of the ring. There may be any number of the prods around the circumference of the wheel, but usually there will be one between each of the spokes.

When the ring-shaped attachment is applied to the wheel and the tire is inflated, as in Fig. 1, the prods do not touch the roadbed $r$ $b$ and consequently have no effect in tearing up or mutilating roadbeds or city pavements and are not themselves injured by contact with stones or metal rails. When, however, the tire is deflated, as by a puncture or other cause, the wheel sinks until the roadbed occupies the position indicated by the dotted line $r^2$ $b^2$, in which relation it will be seen that the prods D come into engagement with the roadbed and serve to support and hold the wheel against skidding.

In pointing out more clearly the distinctive features and values of my invention, it will be seen from Figs. 2 and 3, that the flange *a* of my ring extends outwardly beyond the rim to some distance along the side of the pneumatic tire and lies flat against the same to a distance near the middle line of the rubber tire. This greatly braces and strengthens the tire and the entire wheel, since the ring is one continuous rigid arch around the entire circumference of the wheel and forms a lateral stay to the tire and furthermore, it brings the prods D to a direct tangential bearing against the side of the tire, which not only affords a mutual support for the same but prevents the wedging of stones and other objects in the road bed between the prods and the tire. Moreover, the prods being laterally braced by their side contact with the tire are not liable to be bent sidewise when the strain comes upon them.

To adapt my invention to use on ice, or sleety streets, it is slightly modified, as shown in Fig. 5, in which a set of interchangeable prods D² are provided, whose shanks *d²* are made sufficiently longer to allow the conical points of the prods to engage the roadbed beside the outer periphery of the tire. In such case a helical spring *d³* is wound around the shank of the prod between its shoulder 3 and the outer edge of the ring C to make the prods resilient and yield inwardly against the springs so as to engage the slippery roadbed and still avoid breaking the prods.

In preventing the skidding on slippery road beds, I wish to especially call attention to the fact that the prods in coming in contact with the road bed tear it up but slightly, and much less than the chain arrangement generally used, and do less harm even than the rough shod calks of horseshoes.

I am aware that engaging points have been applied to the rim of a pneumatic tire wheel and I do not claim this broadly.

I claim:

1. An anti-skidding attachment to pneumatic tire wheels, consisting of a continuous ring of angle iron cross section having two flanges at right angles to each other, one flange being substantially the same diameter as the rim of the wheel and at right angles to its plane, and the other flange extending out to the middle line of the pneumatic tire and having perforations in the flange radial to the wheel and parallel to the flange, prods having shanks arranged in said perforations, and means for attaching the ring to the wheel.

2. An anti-skidding attachment to pneumatic tire wheels, consisting of a continuous ring of angle iron cross section having two flanges at right angles to each other, one flange being substantially the same diameter as the rim of the wheel and at right angles to its plane, and the other flange extending out to the middle line of the pneumatic tire and having perforations in the flange radial to the wheel and parallel to the flange, prods having shanks arranged in said perforations, and means for attaching the ring to the wheel, the outer edge of the outer flange, the prods and the pneumatic tire being all arranged in reciprocally bracing contact at a point within the outer periphery of the tire.

3. An anti-slipping prod for a pneumatic tire wheel, comprising a conical point, a reduced concave neck to receive the curve of the tire, and a reduced shank, adapted to be held in a supporting ring beside the tire.

In testimony whereof I affix my signature in presence of two witnesses.

EDWARD E. HOSMER.

Witnesses:
SUSAN E. SINCLAIR,
SAMUEL H. HOSMER.